US007312257B2

(12) United States Patent
Hobbs et al.

(10) Patent No.: US 7,312,257 B2
(45) Date of Patent: Dec. 25, 2007

(54) POLYMER ENCAPSULATION OF HIGH ASPECT RATIO MATERIALS AND METHODS OF MAKING SAME

(75) Inventors: Stanley Young Hobbs, Scotia, NY (US); Fazila Seker, Clifton Park, NY (US); Daniel Steiger, Albany, NY (US); Christopher Mark Hartshorn, Schenectady, NY (US); Ali Ersin Acar, Clifton Park, NY (US); Robert Edgar Colborn, Niskayuna, NY (US); Eelco Michiel Sebastiaan van Hamersveld, Raamsdonksveer (NL)

(73) Assignee: General Electric Company, Schenectady, NY (US)

( * ) Notice: Subject to any disclaimer, the term of this patent is extended or adjusted under 35 U.S.C. 154(b) by 389 days.

(21) Appl. No.: 10/351,386

(22) Filed: Jan. 23, 2003

(65) Prior Publication Data
US 2004/0146641 A1    Jul. 29, 2004

(51) Int. Cl.
C08K 9/10 (2006.01)
C08K 3/30 (2006.01)
C08K 3/22 (2006.01)
C08K 3/08 (2006.01)
C08K 3/34 (2006.01)

(52) U.S. Cl. ............... 523/200; 523/205; 524/420; 524/430; 524/440; 524/441; 524/449; 524/500; 524/577

(58) Field of Classification Search ................ 523/200, 523/205, 212, 214; 524/420, 430, 439, 440, 524/441, 449, 494, 577, 560, 500
See application file for complete search history.

(56) References Cited

U.S. PATENT DOCUMENTS

| 3,635,895 A | | 1/1972 | Kramer ................ 260/47 XA |
| 3,764,456 A | * | 10/1973 | Woodhams ................ 523/209 |
| 3,772,200 A | | 11/1973 | Livesay ................... 252/645 |
| 3,941,731 A | * | 3/1976 | Camelon et al. ........... 523/205 |
| 4,001,184 A | | 1/1977 | Scott ................. 260/47 XA |
| 4,112,036 A | * | 9/1978 | Woodhams et al. .......... 264/28 |
| 4,217,438 A | | 8/1980 | Brunelle et al. ........... 528/202 |
| 4,238,524 A | | 12/1980 | LaLiberte et al. ............ 427/7 |
| 4,598,020 A | | 7/1986 | Panush |
| 4,610,808 A | * | 9/1986 | Kleiner ................... 252/512 |
| 4,699,510 A | | 10/1987 | Alguard |
| 4,771,086 A | | 9/1988 | Martin |
| 4,813,973 A | | 3/1989 | Winnik et al. |
| 5,005,873 A | | 4/1991 | West ..................... 283/92 |
| 5,030,697 A | | 7/1991 | Hugl et al. |
| 5,108,863 A | | 4/1992 | Hsieh et al. |
| 5,128,419 A | | 7/1992 | Fong et al. |
| 5,137,364 A | | 8/1992 | McCarthy |
| 5,142,018 A | | 8/1992 | Sakashita et al. .......... 528/199 |
| 5,151,491 A | | 9/1992 | Sakashita et al. .......... 528/199 |
| 5,171,772 A | * | 12/1992 | Hoy et al. ................ 524/457 |
| 5,201,921 A | | 4/1993 | Luttermann et al. .......... 8/506 |
| 5,314,072 A | | 5/1994 | Frankel et al. ............ 209/44.1 |
| 5,326,692 A | | 7/1994 | Brinkley et al. ............. 435/6 |
| 5,329,127 A | | 7/1994 | Becker et al. ........... 250/459.1 |
| 5,452,379 A | | 9/1995 | Poor ..................... 382/317 |
| 5,510,619 A | | 4/1996 | Zachmann et al. ..... 250/339.08 |
| 5,553,714 A | | 9/1996 | Cushman et al. ........... 209/577 |
| 5,573,909 A | | 11/1996 | Singer et al. ............... 435/6 |
| 5,593,773 A | * | 1/1997 | McKay et al. ............. 428/328 |
| 5,703,229 A | | 12/1997 | Krutak et al. ............. 540/140 |
| 5,744,223 A | | 4/1998 | Abersfelder et al. ........ 428/206 |
| 5,838,451 A | | 11/1998 | McCarthy |
| 5,881,196 A | | 3/1999 | Phillips ................... 385/127 |
| 5,925,716 A | | 7/1999 | Fu et al. |
| 6,099,930 A | | 8/2000 | Cyr et al. ................. 428/64.1 |
| 6,160,787 A | | 12/2000 | Marquardt, Jr. et al. |
| 6,200,628 B1 | | 3/2001 | Rozumek et al. ............. 427/7 |
| 6,219,329 B1 | | 4/2001 | Tanaka et al. |
| 6,251,680 B1 | | 6/2001 | Fu et al. |
| H1975 H | | 7/2001 | Rosendale et al. .......... 523/171 |
| 6,297,508 B1 | | 10/2001 | Barmore et al. ......... 250/459.1 |
| 6,317,947 B1 | | 11/2001 | Ruschmann .............. 29/17.2 |
| 6,355,420 B1 | | 3/2002 | Chan |
| 6,380,547 B1 | | 4/2002 | Gonzalez et al. |
| 6,406,789 B1 | * | 6/2002 | McDaniel et al. .......... 428/402 |
| 6,451,102 B1 | * | 9/2002 | Hilder et al. .............. 106/417 |
| 6,500,526 B1 | | 12/2002 | Hannington .............. 428/195 |

(Continued)

FOREIGN PATENT DOCUMENTS

EP      0 121 261      10/1984

(Continued)

OTHER PUBLICATIONS

Merriam-Webster's Collegiate Dictionary, 10th Edition, Merriam-Webster, Inc., Springfield, MA. 1997 (p. 857).*

(Continued)

Primary Examiner—Callie Shosho
(74) Attorney, Agent, or Firm—Cantor Colburn LLP

(57) ABSTRACT

Embodiments of this invention comprise a pigment comprising one or more substantially spherical-shaped beads, wherein each substantially spherical-shaped bead comprises one or more high aspect ratio particles encapsulated within an encapsulating material. Embodiments also comprise a resinous composition comprising said pigment. Yet further embodiments comprise a method of preparing said pigment via suspension polymerization.

53 Claims, 6 Drawing Sheets

U.S. PATENT DOCUMENTS

| | | | |
|---|---|---|---|
| 6,514,617 B1 | 2/2003 | Hubbard et al. | 428/412 |
| 6,572,784 B1 | 6/2003 | Coombs et al. | 252/301.16 |
| 6,589,626 B2 | 7/2003 | Seilnfreund et al. | |
| 6,638,593 B2 | 10/2003 | Seilnfreund et al. | |
| 6,673,420 B1 | 1/2004 | Muller et al. | 428/187 |
| 6,707,539 B2 | 3/2004 | Seilnfreund et al. | |
| 6,984,682 B2 * | 1/2006 | Polonka et al. | 524/413 |
| 7,030,174 B2 | 4/2006 | Yatake | |
| 2003/0004248 A1 * | 1/2003 | Wakamura et al. | 524/441 |
| 2003/0012562 A1 | 1/2003 | Lawandy et al. | |
| 2003/0195274 A1 * | 10/2003 | Nakamura et al. | 523/160 |
| 2005/0111342 A1 | 5/2005 | Wisnudel et al. | |
| 2005/0119370 A1 | 6/2005 | Paul et al. | |
| 2005/0124745 A1 * | 6/2005 | Bauer et al. | 524/437 |

FOREIGN PATENT DOCUMENTS

| | | |
|---|---|---|
| EP | 0154739 A3 | 9/1985 |
| EP | 0 181 228 | 1/1993 |
| EP | 0 927 750 A1 | 7/1999 |
| EP | 1 220 165 | 7/2002 |
| GB | 1 170 965 | 11/1969 |
| GB | 2264558 A | 9/1993 |
| GB | 2330408 A | 4/1999 |
| JP | 11-21376 | 1/1999 |
| JP | 11-279434 | 10/1999 |
| WO | WO97/15390 | 5/1997 |
| WO | WO98/31011 | 7/1998 |
| WO | WO99/52708 | 10/1999 |
| WO | WO 00/14736 | 3/2000 |
| WO | WO 03/087888 | 10/2003 |
| WO | WO 03/105075 | 12/2003 |

OTHER PUBLICATIONS

Japanese Patent No. JP61049817; Publication date: Mar. 11, 1986; Abstract Only; 1 p.

Japanese Patent No. JP61159453; Publication date: Jul. 19, 1986; Abstract Only; 1 p.

Japanese Patent No. JP62095345; Publication Date: May 1, 1987; Abstract Only; 1 p.

Japanese Patent No. JP62096565; Publication Date: May 6, 1987; Abstract Only; 1 p.

Japanese Patent No. JP62096566; Publication date: May 6, 1987; Abstract Only; 1 p.

International Search Report, International Application No. PCT/US2005/019670; International Filing Date: Jun. 30, 2005; Applicant's File Reference: 08CL153501; Date of Mailing Nov. 15, 2005; 7 pages.

JP11140343A2__Abstract only, two pages.

International Search Report, International Application No. PCT/US2004/001727, International Search Jul. 5, 2004, Date of Mailing Jul. 13, 2004; 3 pages.

* cited by examiner

TYPE I

TYPE II

Solvent Blue 35

Solvent Blue 36

Solvent Green 3

Morplas Red 36

Disperse violet 26

Anaplast Orange LFP

BHT

Non-encapsulated Flakes in PS matrix 200X magnification

Encapsulated Flakes in PS matrix

POLYMER ENCAPSULATION OF HIGH ASPECT RATIO MATERIALS AND METHODS OF MAKING SAME

FIELD OF THE INVENTION

The present invention relates generally to pigments comprising high aspect ratio materials encapsulated in a polymer to form beads, and methods of making same. More specifically, the present invention relates to pigments comprising high aspect ratio flake particles encapsulated in a polymer to form substantially spherical beads that are useable for producing plastic products having a colored, sparkling, and/or metallescent or metal-like appearance, and methods of making same.

BACKGROUND OF THE INVENTION

Current trends in consumer products have created an unprecedented demand for plastics having unique colors and looks. For example, cellular telephones having interchangeable plastic covers are now commonly available. These covers come in a variety of colors and/or special effects, giving consumers control over the aesthetic design of their phones. Many other injection molded plastic products, such as, for example, computers, stereos and other consumer and/or business equipment, automotive interiors, etc., would also benefit from having unique colors and looks.

Plastic products having a sparkling look, a metallescent or metal-like look, a true metal appearance, or any angular metameric appearance are desirable in many instances. Plastics having a sparkling or metallescent look can be created by incorporating free metal flakes into a plastic article at such loading that the individual flakes can be distinguished by the naked eye, resulting in an article with a sparkling or metallescent appearance. Plastics having a true metallic look can be created by using a much higher loading of free metal flakes. The drawback to products incorporating free metallic flakes is that the free flakes have a high aspect ratio, and therefore tend to change orientation at knitlines or other areas of non-uniform flow direction, aligning themselves with the flow field during processing, thereby causing visible flowlines, knitlines or weldlines in the finished product. Such flowlines, knitlines or weldlines produce unattractive streaks in the product. Therefore, there is an increasing demand for sparkling, metallescent and/or metal-looking plastics that cannot be met effectively by incorporating free metallic flakes into plastic articles.

Many desirable pigments and additives for plastics, such as metallic particles, have a high aspect ratio, including, but not limited to, plate-like or flaky particle structures. As previously discussed, during processing such particles tend to orient parallel with the material flow. In some cases, this directionality can be an advantage, such as for improving the flexural modulus of extruded sheet moldings or thin-walled moldings. In other cases, however, this directionality can be disadvantageous, particularly in situations where the parts are complex and a uniform surface appearance is desired. Under such conditions, local variations in flow field direction can produce unacceptable variations in color or reflectivity. Metallic particles/flakes are particularly susceptible to this directionality problem because their reflectivity is high and very directional.

The geometry of the pigment particle is important in determining the optical effects that will be produced. The availability of multiple facets maximizes the reflectivity for a given particle orientation, while a more spherical shape is more hydrodynamically isotropic, thereby favoring the reduction or elimination of flowlines. High aspect ratio particles offer high sparkle efficiency, making them very effective as metallic pigments. However, these particles are also responsible for the appearance of visually objectionable flowlines.

There is presently no good way to ensure that pigments and additives having a high aspect ratio are optically anisotropic and rheologically isotropic when processed into plastic products. Cubes and octahedra seem to satisfy these two conditions, and in fact, existing techniques have attempted to resolve the directionality problem of flake materials by encapsulating the flake materials in a substantially cubic material. While cubic shaped materials are less sensitive to flow-induced orientation than flakes are, and thereby reduce the appearance of flowlines, this technique does not eliminate flowlines. Additionally, producing particles of complicated geometries (i.e., other than spheres and platelets) is nontrivial, and introduces unnecessary filler mass to the final product. As a result, considerable efforts have focused on the investigation of a number of processing solutions to eliminate flowlines. Sequential gating, the use of complicated mold temperature profiles, and agitation of the mold have been found to reduce the appearance of flowlines considerably. However, these methods all require the use of highly specialized equipment, making them extremely uneconomical and impractical. Alternatively, using aluminum beads has been investigated as a possible solution. However, due to the absence of facets or sizeable reflective surfaces in aluminum beads, a reflective metallic look cannot be achieved in the end product.

Japanese Kokai Patent Application No. Hei 11[1999]-279434 describes a metallic pigment prepared by coating a transparent resin on at least one facet of glossy polyhedron particles. Japanese Kokai Patent Application No. Hei 11[1999]-21376 describes composite glittering agents that are cross-linked polymer particles containing glossy particles, resin compositions containing the glittering agents, and molded resin products made therefrom. However, neither of these references addresses the problem of glossy particles delaminating from the composite.

Thus, there is a need for systems and methods that ensure that the angular distribution of materials with high aspect ratios (for example, plate-like/flake pigments and additives) in complex flow fields remains optically anisotropic and rheologically isotropic when processed into plastic products. There is also a need for such systems and methods to be less expensive and less highly specialized than existing systems and methods. There is yet a further need for such systems and methods to substantially eliminate the appearance of flowlines. There is still a further need for such systems and methods to encapsulate high aspect ratio materials within a cross-linked or cross-linkable polymer. There is also a need for such systems and methods to provide higher flake-encapsulating bead yields than currently possible. There is yet still a further need for such systems and methods to utilize encapsulated high aspect ratio materials as pigments in injection molded or extruded plastics to create plastic articles substantially free of flowlines and having a sparkling and/or metallescent appearance. There is also a need to address the problem of high aspect ratio materials delaminating from the encapsulant bead during compounding and/or molding operations. Finally, there is a need for such systems and methods to incorporate dyes therein to allow colored, sparkling and/or metallescent appearing products to be created.

SUMMARY OF THE INVENTION

Accordingly, the above-identified shortcomings of existing systems and methods are overcome by embodiments of the present invention, which relates to pigments comprising high aspect ratio materials encapsulated in a polymer to form substantially spherical beads, and methods of making same.

Embodiments of this invention comprise a pigment comprising one or more substantially spherical-shaped beads, wherein each substantially spherical-shaped bead comprises one or more high aspect ratio particles encapsulated within an encapsulating material. Embodiments of this invention also comprise methods to make said pigments.

Embodiments of this invention also comprise a resinous composition comprising a plastic matrix material and a pigment, the pigment comprising one or more substantially spherical-shaped beads, wherein each substantially spherical-shaped bead comprises one or more high aspect ratio particles encapsulated within an encapsulating material.

Embodiments of this invention also comprise molded articles made from said compositions.

Further features, aspects and advantages of the present invention will be more readily apparent to those skilled in the art during the course of the following description, wherein references are made to the accompanying figures which illustrate some preferred embodiments of the present invention, and wherein like characters of reference designate like parts throughout the drawings.

DESCRIPTION OF THE DRAWINGS

The systems and methods of the present invention are described herein below with reference to the various figures, in which.

DETAILED DESCRIPTION OF THE INVENTION

Disclosed herein are pigments comprising high aspect ratio materials encapsulated in a polymer to form substantially spherical beads, and methods of making same. These pigment are useable for producing plastic products having a colored, sparkling, and/or metallescent appearance. Embodiments comprise systems and methods that ensure that the angular distribution of high aspect ratio materials (for example, plate-like/flake pigments and additives) in complex flow fields remains optically anisotropic and rheologically isotropic when processed into plastic products. In some embodiments, the systems and methods may be less expensive and less highly specialized than existing systems and methods. In some embodiments the systems and methods may substantially eliminate the appearance of flowlines. Embodiments also encapsulate high aspect ratio materials within a cross-linked or cross-linkable polymer to form a bead, and can provide higher bead yields than currently possible. Furthermore, embodiments utilize encapsulated high aspect ratio materials as pigments in injection molded or extruded plastics to create plastic articles substantially free of flowlines and having a colored, sparkling, and/or metallescent appearance. Embodiments relate to specific processing conditions that can be employed to minimize the delamination of high aspect ratio materials from the encapsulant bead during compounding and/or molding operations. Finally, embodiments may incorporate dyes or colored pigments therein to allow colored sparkling and/or metallescent appearing products to be created.

Embodiments of the present invention comprise substantially spherical beads formed by encapsulation of high aspect ratio materials within a polymer. These beads may be used in various processes (for example, injection molding, extrusion, sheet molding, solution-based processing techniques such as spin-coating or solution-casting, etc.) to form plastic products having a colored, sparkling, and/or metallescent appearance.

Figure 1:
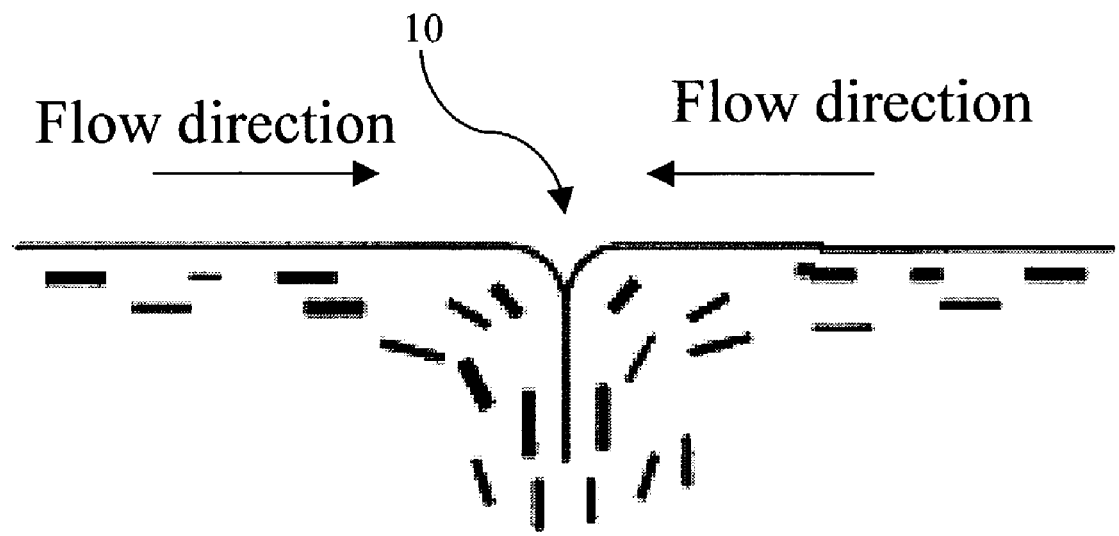
FIG. 1 is a schematic diagram showing a cross-section of an injection molded part taken perpendicular to a knitline and showing the orientation of unencapsulated anisotropic particles.

Referring now to FIG. 1, there is shown a schematic diagram showing the directional orientation of unencapsulated (i.e., free) flakes in an injection molded polymer material. The high aspect ratio flakes or plate-like particles shown here tend to change orientation with the flow field at the knitline 10, aligning themselves with the knitline and increasing knitline visibility. This invention seeks to minimize or eliminate the visibility of these knitlines/flowlines.

Figure 2:
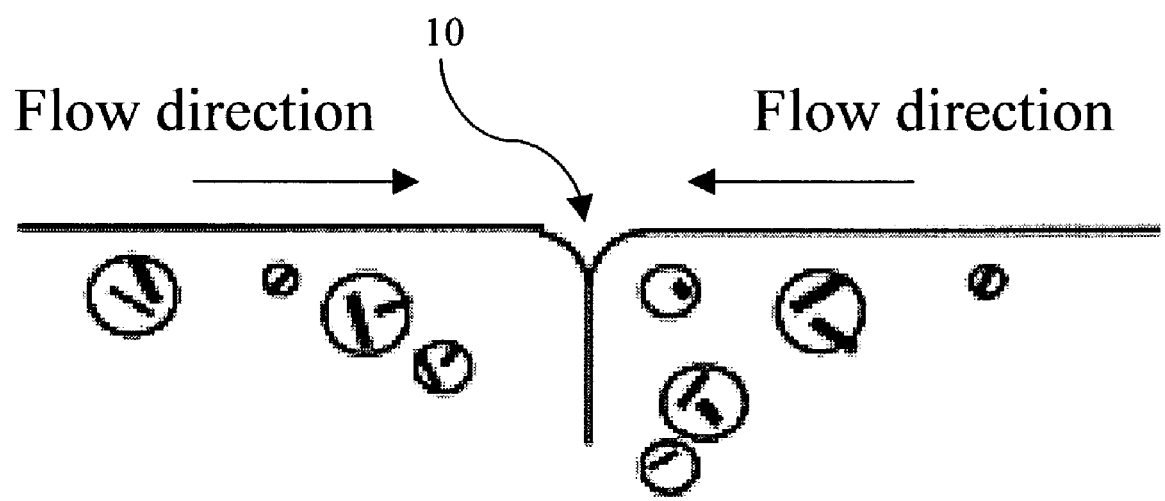
FIG. 2 is a schematic diagram showing a cross-section of an injection molded part taken perpendicular to a knitline and showing the random orientation of encapsulated anisotropic particles.

Referring now to FIG. 2, there is shown a schematic diagram of one embodiment of the present invention. In this embodiment, the random orientation of encapsulated flakes in a polymer material is shown. Once the flakes are encapsulated, they are substantially hydrodynamically isotropic, and are thereby substantially insensitive to flow direction. This reduces or eliminates the appearance of the knitlines 10. Additionally, the flakes encapsulated within the transparent, translucent and/or colored, substantially spherical polymer beads retain their very specular or mirror-like reflection characteristics. In this embodiment, the flake-encapsulating bead is optically anisotropic (i.e., the desired optical effect is preserved), but rheologically isotropic (i.e., there is no preferential flake orientation at knitlines and other areas of highly directional and/or nonuniform flow direction).

The present invention comprises materials having high aspect ratios (for example, flakes or plate-like particles) embedded or encapsulated in substantially spherical droplets or beads. As used herein, materials having high aspect ratios comprise those materials having an average aspect ratio of greater than about 4:1, greater than about 5:1, greater than about 8:1, greater than about 9:1, and greater than about 40:1, in various embodiments respectively. In other embodiments, materials having high aspect ratios comprise those materials having an average aspect ratio of about 4:1 to about 40:1, of about 5:1 to about 40:1, and of about 9:1 to about 40:1, in various embodiments respectively.

Materials having high aspect ratios that are suitable for use in this invention comprise materials having at least 2 facets, about 2 to about 100 facets, about 3 to about 50 facets, about 4 to about 10 facets, less than 4 facets, about 2 to about 4 facets, and about 2 to about 3 facets, in various embodiments respectively.

The high aspect ratio materials utilized in this invention may comprise any suitable material that provides the desired colored, metallic, sparkling and/or metallescent appearance in a resinous composition. Some non-limiting examples of such materials comprise aluminum, gold, silver, copper, nickel, titanium, stainless steel, nickel sulfide, cobalt sulfide, manganese sulfide, metal oxides, white mica, black mica, synthetic mica, mica coated with titanium dioxide, metal-coated glass flakes, colorants, including but not limited, to Perylene Red, or any other suitable high aspect ratio material that may be susceptible to forming flowlines when used by itself in an unencapsulated form in a resinous composition. Mixtures of high aspect ratio materials are also included in embodiments of the present invention. For example, a mixture of a high aspect ratio colorant and a high aspect ratio additive to provide metallic, sparkling and/or metallescent appearance may be employed. In many embodiments only one high aspect ratio additive is employed.

Figure 3:
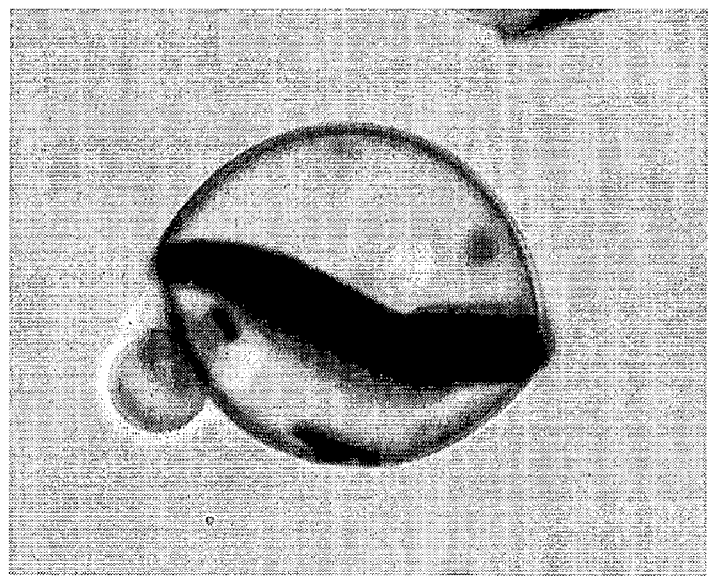
FIG. 3 shows a photograph showing flakes that are fully encapsulated within the bead (Type I) and flakes that are surface laminated to the bead (Type II)
Figure 3:
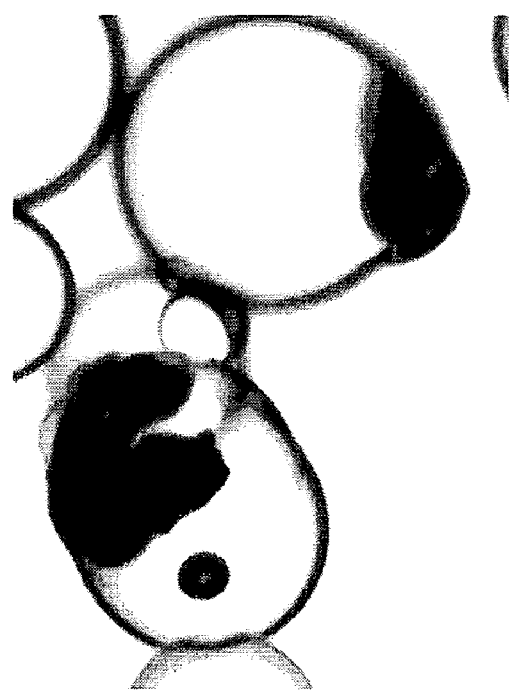

These substantially spherical beads may have an average aspect ratio of less than about 2:1, of less than about 1.5:1, of less than about 1.2:1, of less than about 1.1:1, or of about 1:1, in various embodiments respectively. Generally, it is desirable for the beads containing encapsulated high aspect ratio material to have an average aspect ratio of about 1:1 to ensure that there is little or no preferential orientation or alignment near knitlines, flowlines, etc. As used herein, the terms "knitline", "flowline", and "weldline" are all used interchangeably to mean areas of highly directional and/or non-uniform flow direction. Furthermore, as used herein, the terms "encapsulation", "flake-encapsulating" and any similar variations cover both flakes that are fully encapsulated within the bead (FIG. 3, Type I), as well as flakes that are surface laminated to the bead (FIG. 3, Type II). Both bead types may be present in varying degrees in materials prepared by methods described herein, and depending on which bead type comprises the majority of the bead population, the appropriate processing conditions, as described below herein, may be applied to achieve plastic articles substantially free of visible flowlines.

The substantially spherical beads preferably have an average diameter that is at least equal to, or slightly exceeds, the average length of the high aspect ratio particle encapsulated therein. These beads may have an average diameter of between about 10 µm to about 300 µm, of between about 15 µm to about 300 µm, of between about 201 µm to about 300 µm, of between about 40 µm to about 250 µm, of between about 80 µm to about 2001 µm, or of between about 90 µm to about 140 µm, in various embodiments respectively. Those skilled in the art will recognize that in these various embodiments, individual beads having a diameter less than or greater than the average diameters listed may exist, without causing the average bead diameter of the bead population to fall outside the specified ranges. The high aspect ratio particles that are encapsulated within the beads preferably have average values for their greatest dimension in the same range as the average diameters of the beads within which they are encapsulated, with the average value for the greatest dimension of the high aspect ratio particles preferably being equal to or slightly less than the average diameter of the beads within which they are encapsulated. For example, in one embodiment, the high aspect ratio particles encapsulated within the beads may comprise flakes having a maximum dimension of about 100 µm or slightly less, with the beads having an average diameter of about 100 µm.

The average amount (i.e., weight) of high aspect ratio material encapsulated within the polymer encapsulating bead material is typically an amount necessary to achieve a desired colored, metallic, sparkling and/or metallescent appearance for a particular concentration of beads in a resinous composition, wherein the average amount of high aspect ratio material may be determined by dividing the total weight of the high aspect ratio material used by the total weight of the beads. The average amount of high aspect ratio material encapsulated within the polymer encapsulating bead material may be less than about 25 wt. %, between about 0.1 and about 25 wt. %, between about 1 and about 20 wt. %, between about 2 and about 15 wt. %, between about 5 and about 10 wt. %, between about 10 to about 15 wt. %, between about 0.1 to about 5 wt. %, or between about 0.1 to about 4 wt. %, in various embodiments respectively, based on the weight of the pigment bead. Those skilled in the art will recognize that in the total bead populations of these various embodiments, there may be individual beads that have no high aspect ratio material encapsulated therein, and there may be individual beads that have greater than 25 wt. % high aspect ratio material encapsulated therein, without causing the average amount of high aspect ratio material encapsulated within the polymer beads of a given bead population to fall outside the specified ranges.

The polymer material (i.e., the encapsulating material) surrounding the high aspect ratio particles may comprise any material that has a sufficient amount of transparency and/or translucency to allow the desired optical effect in a plastic product to be achieved. Some non-limiting examples of such materials comprise a thermoset resin, a polymer prepared by suspension polymerization, or a polymer that is a thermoplastic.

Such thermoset resins may comprise, for example, epoxy, phenolic, acrylics, alkyds, polyester, polyimide, polyurethane, silicone, bis-maleimide, cyanate ester, vinyl, and/or benzocyclobutene resins. The thermoset resin composition may also comprise various catalysts, flame retardants, curing agents, fillers, reinforcing agents, and other components, if so desired. The various thermoset resin components may be used alone, in combination with one another, or in combination with another thermoplastic resin(s).

Such thermoplastics may comprise, for example, polyesters, such as polyethylene terephthalate (PET); polybutylene terephthalate (PBT); polyethylene naphthalate (PEN); polybutylene naphthalate (PBN); polycyclohexane dimethanol terephthalate (PCT); polyethylene-co-cyclohexane dimethanol terephthalate (PETG); liquid crystal polyester (LCP) and the like; polyolefins, such as polyethylene (PE), polypropylene (PP), polybutylene, polymethylpentene and the like; resins comprising structural units derived from styrene monomer such as polystyrene, styrene-acrylonitrile copolymer (SAN), acrylonitrile-styrene-butadiene (ABS) and acrylonitrile-styrene-acrylate (ASA); polyoxymethylene (POM); polyamide (PA); polycarbonate (PC); bisphenol A polycarbonate; polyvinyl chloride (PVC); polyphenylene sulfide (PPS); polyphenylene ether (PPE); polyimide (PI); polyamide imide (PAI); polyetherimide (PEI); polysulfone (PSU); polyether sulfone (PES); polyketone (PK); polyether ketone (PEK); polyether ether ketone (PEEK); polyarylate (PAR); phenol resins (novolac type or the like); phenoxy resins;

fluorocarbon resins; or, furthermore, thermoplastic elastomers, examples of which include, but are not limited to, a polystyrene type, a polyolefin type, a polyurethane type, a polyester type, a polyamide type, a polybutadiene type, polyisoprene type, a fluorine type, a siloxane type, a natural rubber, a synthetic rubber, or the like; or copolymers or modifications of any of the these substances, or combinations of two or more of these substances or the like. Examples of copolymers include, but are not limited to, polydimethyl siloxane-polycarbonate copolymer, polyester-carbonate copolymer, ethylenepropylene copolymer, and ethylene-propylene diene modified copolymer (EPDM). Thermoplastics and elastomers may optionally be appropriately modified using means known in the art to introduce crosslinkable sites therein. In a particular embodiment thermoplastics or elastomers may be comprise allyl or olefinic groups, and may be prepared from monomers comprising allyl or olefinic groups. Preferably, in the case of suspension polymerization, the encapsulating material comprises polystyrene (PS), polymethyl methacrylate (PMMA), styrene acrylonitrile copolymer (SAN), methyl methacrylate styrene acrylonitrile copolymer, acrylonitrile-styrene-acrylate (ASA) resins, or combinations thereof.

At least one cross-linking agent may be included in the polymer material (i.e., the encapsulating material) surrounding the high aspect ratio particles. In some embodiments the inclusion of a cross-linking agent may impart mechanical strength and/or melt stability to the pigment beads when they are processed in a composition to make a final extruded or molded product. An illustrative cross-linking agent is divinylbenzene. The amount of cross-linking agent employed may affect the physical properties of the final product. The amount of cross-linking agent that may be incorporated in the encapsulating material is determined by such factors as the physical properties desired in the final product and the compounding conditions used (for example, all-throat feeding vs. down-stream feeding during extrusion), and may be determined by those skilled in the art without undue experimentation. For example, in some embodiments at the same cross-linker loading, compositions extruded using down-stream feeding may be less ductile than those produced using all-throat feeding.

In some embodiments molded parts may become less ductile with increased cross-linker loading. Increasing the loading of pigment beads themselves may also result in decreased ductility in certain embodiments. The ductility of the final molded product will depend, in part, on the properties of the carrier resin used.

Other additives may be included in the encapsulating bead material. Such additives may be included for various reasons. Such additives may help maintain a desired visual effect and/or may help the beads retain their substantially spherical shape when processed into the final product. Other additives may be added to improve the bead yield over those currently possible. For example, chain transfer agents may be added, and/or retarders and/or inhibitors may be added to improve the bead manufacturing process. Additionally, dyes may be added so that colored sparkling and/or metallescent appearing products can be created. Some non-limiting examples of suitable additives comprise any suitable colorant, Solvent Blue 35, Solvent Blue 36, Disperse Violet 26, Solvent Green 3, Anaplast Orange LFP, Perylene Red, Morplas Red 36, thermal stabilizers, oxidation inhibitors, butylated hydroxytoluene (BHT), radical scavengers, any vinyl-based monomer, filler (for example, titanium dioxide, carbon black and/or graphite), impact modifiers, UV absorbers, and/or fire retardants, etc.

These pigment beads comprising high aspect ratio material encapsulated in a polymer may be used to create plastic products having a colored, sparkling, metallescent, metal-like, true metal, and/or an angular metameric appearance. Such products may be created by dispersing such pigment beads in a plastic matrix. Suitable plastic matrix materials comprise those materials that are prone to visible flowline formation when they contain only unencapsulated high aspect ratio materials. In particular embodiments suitable plastic matrix materials include, but are not limited to, all those plastic and elastomeric materials listed hereinabove for encapsulating high aspect ratio materials. In addition to the pigment beads, these plastic matrices may also comprise additives, such as, for example, dyes or any other suitable colorants, thermal stabilizers, oxidation inhibitors, radical scavengers, fillers (for example, titanium dioxide, carbon black and/or graphite), impact modifiers, UV absorbers, and/or fire retardants, provided that the desired colored, sparkling, metallescent, true metal or angular metameric appearance is preserved when such additives are present. In some embodiments the plastic matrices may comprise unencapsulated high aspect ratio material in addition to that added in encapsulated form. The presence of all or at least a portion of the unencapsulated material in compositions comprising encapsulated material may result from delamination of encapsulated material during processing, from contamination of encapsulated material with unencapsulated material, or from the deliberate addition of unencapsulated material to the composition. The amount of unencapsulated high aspect ratio material in compositions comprising encapsulated material is such that the presence of flowlines, knitlines, or weldlines in molded parts derived from said compositions is substantially eliminated or at least reduced compared to compositions not containing encapsulated high aspect ratio material.

The loading of such pigments comprising high aspect ratio materials dispersed within such plastic matrices is typically an amount necessary to achieve the desired colored, sparkling, metallescent, metal-like, true metal and/or angular metameric appearance in the final plastic article created therewith. For example, the loading of such pigments may comprise values in the range of about 0.05 to about 10 wt. %, of about 0.05 to about 5 wt. %, of about 0.05 to about 4 wt. %, of about 0.05 to about 3 wt. %, or of about 0.1 to about 3 wt. %, in various embodiments respectively.

In some embodiments the polymer encapsulating material of the beads may substantially match the refractive index of the plastic matrix in which the beads are contained. For example, the refractive index difference between the polymer encapsulating material of the beads and the plastic matrix in which the beads are contained may be less than about 0.01 to yield a substantially transparent final product (if the plastic matrix itself is substantially transparent and no other pigmentation is added). Alternatively, the refractive index difference between the polymer encapsulating material of the beads and the plastic matrix in which the beads are contained may be in the range of between about 0.01 and about 0.05, or could even be greater than about 0.05, to yield final products having various degrees of translucency.

The encapsulation of the high aspect ratio material, and an optional further cross-linking of the polymer encapsulation material, may be accomplished in a number of different manners, such as, for example, spray drying techniques, the Wurster process, or in-situ suspension polymerization. In some embodiments when suspension polymerization is utilized, the method may comprise the steps of: dispersing high aspect ratio particles in at least one of a monomer or a polymer to form a suspension mixture; adding the suspension mixture to an aqueous mixture comprising a suspension agent; heating and mixing the aqueous reaction mixture to encourage the formation of beads, wherein most beads encapsulate one or more high aspect ratio particles; quenching the aqueous reaction mixture after the beads are formed; and collecting the beads. This method may further comprise suspending the one or more high aspect ratio particles in the suspension mixture by sonicating the suspension mixture prior to adding the suspension mixture to the aqueous mixture. It may also comprise utilizing gravity sedimentation or centrifugation to separate the beads into various batches, and drying the beads thereafter.

The gravity sedimentation utilized in embodiments of this invention may comprise: a) removing from the beads the microemulsion caused by the suspension polymerization process; b) filtering the beads; c) reslurrying the beads in a salt solution (for example, 5-20 weight % potassium chloride) to form a separation system having an original volume; d) mixing the separation system, for example by shaking the system up; e) allowing the separation system to stand still to come to equilibrium; f) removing a fraction of useable beads from the separation system; g) filtering the fraction of useable beads that is obtained from the separation system; h) washing the filtered fraction of useable beads to remove any excess slurry solution; i) adding a quantity of deionized water to the remaining beads and slurry solution in the separation system to bring the volume of the separation system back to the original volume; and j) repeating steps d)-i) as necessary until all the beads have been removed from the separation system. If necessary, the first fraction of beads that are obtained may be discarded since that fraction may also contain free (i.e., unencapsulated) high aspect ratio particles that could cause flowlines in the final product.

In one embodiment, aluminum flakes having diameters of less than about 100 micrometers are encapsulated in a polymer. This encapsulation may be achieved via suspension polymerization of monomers in the presence of the aluminum flakes. A cross-linking agent may be included to impart mechanical strength and melt stability to the encapsulated beads when they are processed into the final extruded or molded product. The flakes may also incorporate surface functionalization thereon, so that growth of the encapsulant polymer is a surface promoted process. In the case of suspension polymerization, surface functionalization may also be necessary for flakes that have a hydrophilic surface.

In order to make high aspect ratio materials such as flakes having a hydrophilic surface compatible with organic monomers, such materials may need to be treated with a compatibilizer, such as, for example, oleic acid. Unencapsulated high aspect ratio materials can be divided into two categories with respect to their behavior in organic media: organic compatible and organic non-compatible. The material's behavior may be tested by preparing a biphasic mixture such as toluene/water, and then adding the material into that mixture. If the material stays in the organic portion of the mixture, the material is organic compatible (i.e., hydrophobic). If the material prefers the aqueous layer of the mixture, the material is organic non-compatible (i.e., hydrophilic). The test is indicative of the material's preference for one of these two phases: hydrophobic or hydrophilic. For higher encapsulation efficiency, it is desirable to have organic compatible (i.e., hydrophobic) materials. Therefore, in cases where materials are found non-compatible, surface treatment/modifications may be carried out to render such materials organic compatible.

Rendering such materials organic compatible may entail the use of organic molecules that can bind to the surface of the material. Once binding is achieved, the organic layer should be hydrophobic enough to render the material organic compatible. In general, such molecules, often called surface modifiers, comprise a long alkyl chain and a polar end group such as, for example, thiols, sulfonic acids, phosphonic acids, carboxylic acids, carboxylates, amines, and/or quaternary ammonium salts. Surface modifiers may be polymeric, and may comprise, for example, sulfonated polystyrene, polystyrene bearing amino groups and sulfonated EPDM. The nature of the polar end group will depend on the nature of the surface. Depending on the substrate, a convenient end group may be chosen to achieve an interaction that can be ionic, covalent or non-covalent in nature. The surface modifier can also contain, besides the end group and hydrophobic portion, other reactive groups. Such reactive groups can be used to carry out further reactions. This procedure to render such materials organic compatible can also be used when the material or the surface modifier is wet or contains organic components that can be removed by known procedures such as, for example, simple or azeotropic distillation.

Numerous flake particles are commercially available, such as, for example, aluminum flakes. Many times, these flake particles are contained in a carrier agent, such as mineral oil. In various embodiments the flakes may be used as received, or the carrier agent may be removed by washing the flakes in a suitable solvent. In either case, the flakes may be added directly to the suspension of reactants in water, or the flakes may first be suspended in the monomer(s) by sonication at room temperature, and then be added to an aqueous solution comprising polyvinyl alcohol (PVA) as a suspension agent.

EXAMPLE ONE

Coated glass pigments may be compatibilized (i.e., made to be compatible with organic monomers) using oleic acid. In one embodiment, about 11.4 g of coated glass flake (30 micrometers), about 50 ml of toluene, and about 2.85 g of oleic acid as a surface modifier (20 weight % with respect to the flake, 90% purity from Aldrich) were put into a round bottom flask fitted with a Dean-Stark trap and a stirrer. The mixture was stirred under azeotropic conditions for about two hours. The compatibility of the flakes was then tested, as mentioned above, by adding water and toluene. It was found that the surface of these treated flakes was now hydrophobic, as evidenced by the fact that most of the surface treated flakes stayed in toluene, whereas only some of the non-surface treated flakes stayed in toluene.

EXAMPLE TWO

About 11.4 g of coated glass flake (30-90 micrometers), about 50 ml of styrene, and about 2.85 g of oleic acid (20 weight % with respect to the flake, 90% purity from Aldrich) were put into a round bottom flask fitted with a condenser and a stirrer. The heterogeneous solution was stirred at about 80° C. for about two hours. The resulting mixture was then used for suspension polymerization. The resulting beads contained a higher amount of encapsulated glass flake than did beads made using glass flake that had not been surface treated.

In both EXAMPLE ONE and EXAMPLE TWO, surface modifiers containing a carboxylic acid end group were used for purposes of flake/monomer compatibility. Aluminum flakes were also modified with vinyl benzoic acid and 4,4'-azobis(4-cyano valeric acid). Vinyl benzoic acid and 4,4'-azobis(4-cyano valeric acid) can be classified as reactive surface modifiers since they can be employed as monomers and initiators in radical polymerization, respectively.

Figure 4:
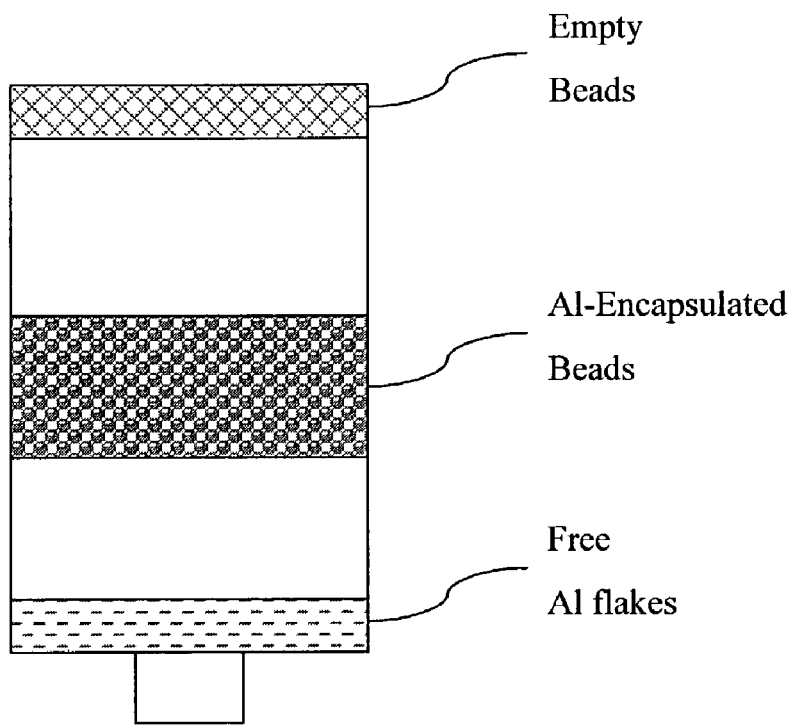
FIG. 4 is a schematic diagram showing how the beads are separated by gravity sedimentation (the liquid medium in this embodiment may comprise a 5-20 weight % potassium chloride solution that may contain 3-6 drops of a 0.1% Triton-X surfactant solution)
Figure 6:
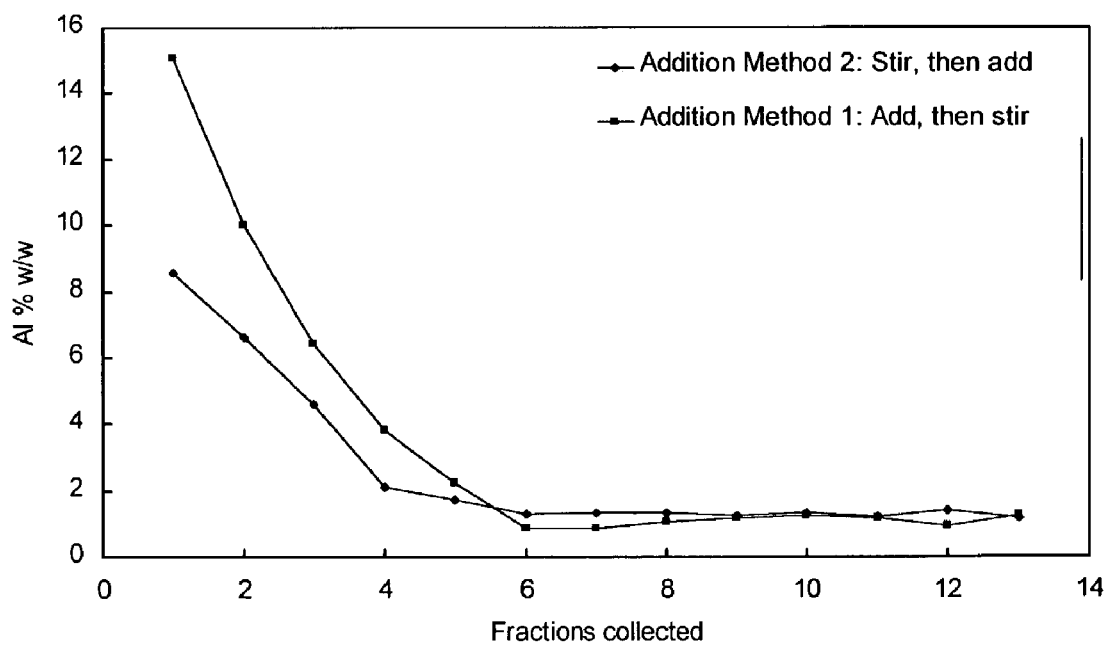
FIG. 6 is a graph showing the aluminum flake distributions obtained by two methods of this invention.
Figure 5:
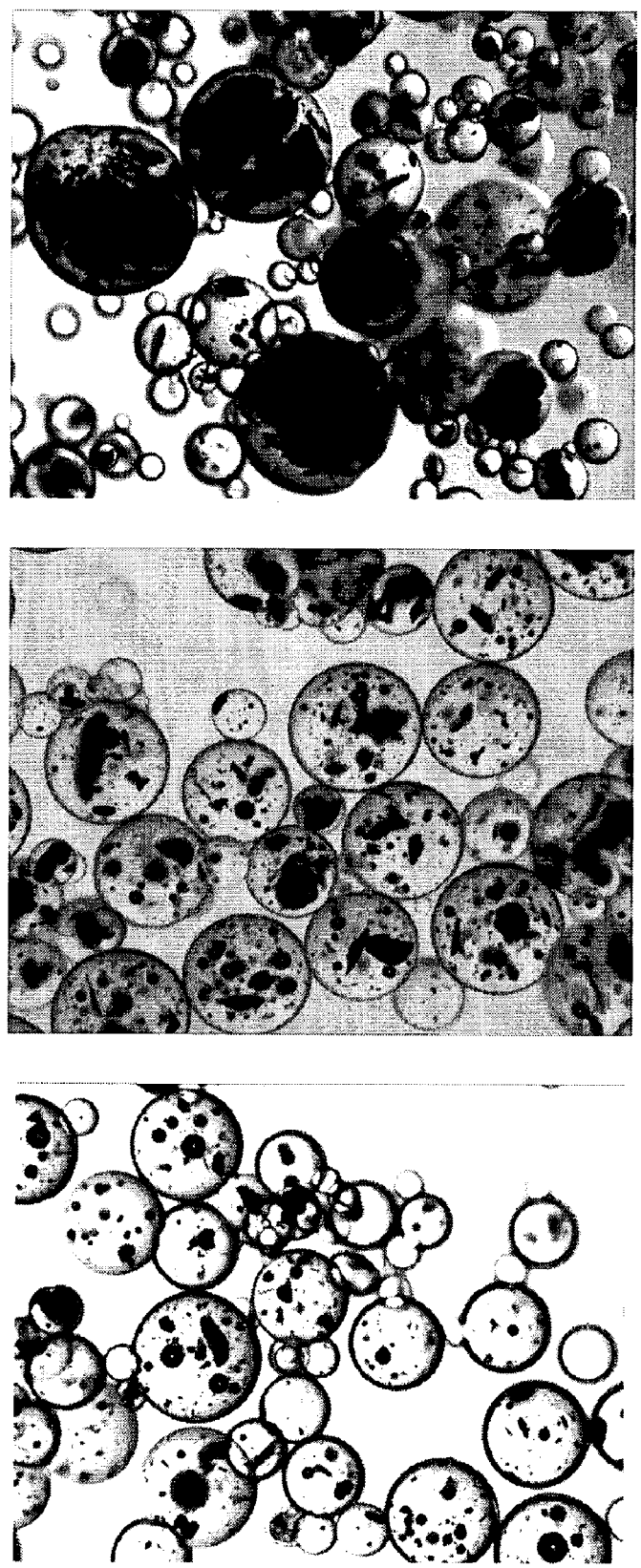
FIG. 5 is a photograph showing various amounts of flakes encapsulated in substantially spherical polymer beads.

Once formed, the beads may be separated into various batches of beads of differing densities via gravity sedimentation (also called gravity separation, gradient sedimentation, and/or gradient separation, or the like). The beads may also be separated via centrifugation, or in any other suitable manner. A general description of the gravity sedimentation process followed in embodiments of this invention will now be described. After removing the microemulsion (i.e., white water) from the beads, the beads were filtered. Filtering was done using a Buchner funnel and filter paper. Thereafter, the wet beads were reslurried in an original volume of about 5-20 weight % potassium chloride or sodium chloride. In one particular embodiment, the wet beads were reslurried in a 15 wt. % potassium chloride or sodium chloride solution, and were then transferred into a 4 liter separation funnel. Occasionally, 2 to 3 droplets of a 0.1 weight % Triton X-100 solution in water was added to improve the wetting of the beads, when and if necessary. The slurry was then shaken up and left to stand for about 15-30 minutes until the system was in equilibrium. The empty beads tended to float to the top of the slurry, the flake-encapsulating beads tended to float but remain below the empty beads in the slurry, and the free flakes tended to sink to the bottom of the slurry, as shown in FIG. 4. The first fraction of the useable beads (about a 250 ml volume) was removed/drained, filtered and washed with deionized water to remove any excess potassium or sodium chloride. This first fraction of beads was usually discarded, if necessary, since this fraction often contained some free aluminum flakes, which can cause flowlines in the final product. This was particularly the case if only styrene was used as the monomer. Next, deionized water was added to the separation funnel to return the volume in the funnel to approximately the original volume, and to dilute the slurry and decrease its density. By changing the density of the slurry, beads having a different amount of aluminum flake content could be collected in each pass, as shown in FIG. 5 and FIG. 6. This allowed beads having specific aluminum contents to be used in a given product, thereby allowing different visual/optical effects to be created just by varying the beads that were combined to make the finished product. After shaking, the standing, removing/draining, filtering, washing and diluting procedure was repeated until there were almost no beads remaining in the funnel, which typically took about 12-15 dilutions. The beads were then dried in a vacuum oven at about 50-60° C. for at least about 48 hours. After sieving through a 300 μm stainless steel sieve, the beads were ready for use in such processes as compounding, extruding and/or injection molding.

EXAMPLE THREE

In this embodiment, novel special effects in injection molded or extruded plastics were created using common polymer processing techniques. This embodiment comprised aluminum flakes encapsulated in polystyrene. This reaction system included the use of about a 1-2 weight % aqueous solution of polyvinyl alcohol (PVA) (molecular weight 124000-186000, 87-89% hydrolyzed) as the suspending medium. The monomer, styrene in this embodiment, was mixed with about 1-2 weight % (based on the monomer) of divinylbenzene (a cross-linker), and the mixture was then sonicated. After sonication, about 0.3 weight % (based on the monomer) benzoyl peroxide (an initiator) was added to the styrene mixture, and the new mixture was briefly shaken. The monomer system comprising styrene monomer and initiator was added to the aqueous suspending agent (PVA dissolved in water) without stirring, and comprised about 10-20 weight % of the suspending medium/agent. The aluminum flakes were added directly to the suspension of reactants in water, or the flakes were first suspended in the pure monomer by sonication at room temperature, and then added to the aqueous PVA solution. The reaction mixture was then stirred at about 300 rpm and heated at about 80° C. for about one hour, followed by heating at about 85° C. for about two more hours. The reaction mixture was then quenched (for example, by cooling or diluting the mixture), the microemulsion was removed, and the resultant beads were then collected by filtration (for example, by gravity sedimentation as described in detail above, or by centrifugation) and washed with water.

The product beads, comprising metallic flakes encapsulated within the cross-linked polymer spheres, may then be compounded into a target resin system (i.e., a plastic matrix) using traditional polymer processing techniques (for example, extrusion, injection molding, sheet molding, solution-based processing techniques such as spin-coating or solution-casting, etc.). This embodiment yields pigment particles comprising faceted aluminum flakes/particles encapsulated in a substantially spherical polymer bead. This substantially spherical shape makes the particles relatively insensitive to flow fields when these beads are processed into plastic products. The substantially spherical shape, combined with the faceted nature of the embedded flakes/particles, should theoretically produce parts having virtually no visible flowlines and a sparkling, metallescent or true metal look, depending on the concentration of the encapsulated aluminum pigment that is used.

When styrene and divinylbenzene were used as the only monomers using the preparation method of EXAMPLE THREE, the encapsulation method was not 100% effective. The majority of aluminum flakes were merely surface laminated to the polymer beads instead of being fully encapsulated within the beads, and many empty beads were apparent via optical microscopy. Additionally, there were some visible flowlines in the final molded product that incorporated these beads in a plastic matrix of polystyrene when the composition was processed (before molding) by extrusion compounding with all composition components being throat-fed. Investigation showed that some of these surface laminated flakes became delaminated from the encapsulant bead under the high shear conditions during extrusion and/or injection molding, causing some visible flowlines.

When surface laminated flakes (such as Type II in FIG. 3), rather than fully encapsulated flakes, are present in plastic matrices, extrusion compounding with all-throat-feeding of the composition components can result in the appearance of flowlines in subsequently molded parts. Although this invention is in no way dependent upon theory, the appearance of flowlines is believed to be generally a result of laminated flakes detaching from the surface of beads to form free flakes under the high shear conditions associated with extrusion. The amount of free (i.e., unencapsulated) high aspect ratio material that can tolerably be present in compositions comprising encapsulated high aspect ratio material in a plastic matrix may be less than about 1 wt. %, less than about 0.5 wt. %, less than about 0.2 wt. %, less than about 0.1 wt. %, less than about 0.05 wt. %, less than about 0.01 wt. %, or less than about 0.005 wt. %, in various embodiments respectively, based on the weight of the entire composition. These range limits for unencapsulated material in compositions comprising encapsulated material apply when the presence of all or at least a portion of the unencapsulated material results from delamination of encapsulated material, or from contamination of encapsulated material by unencapsulated material, or when all or at least a portion of unencapsulated material is deliberately added to the composition. In general, at comparable weight percent loading in the composition, it has been observed that smaller diameter free flakes may result in more prominently visible flowlines than larger diameter free flakes.

One way to stop laminated flakes from detaching from the surface of beads is to add the pigment bead material to the plastic matrix resin prior to molding and then compounding during molding. This typically results in such flakes remaining laminated to the bead surface, and may result in an aesthetically pleasing molded part when the pigment beads can be well dispersed throughout the plastic matrix. In some embodiments, when pigment beads cannot easily be well dispersed in the plastic matrix, then dispersion may be improved by employing all, or at least a portion of the plastic matrix resin in the form of a powder, which has a higher surface area and will therefore promote mixing and dispersion of pigment during molding. Another solution to this problem is to decrease the amount of time that resin beads of Type II are exposed to high-shear conditions that may promote delamination. In one embodiment, all, or at least a portion, of pigment beads are provided to an extrusion compounder at a feed inlet at some barrel segment following the feed-throat, wherein all, or at least a portion, of the remaining blend components comprising plastic matrix resin have been throat-fed (so-called "down-stream feeding"). This results in the pigment beads experiencing a high shear environment for shorter periods of time, which leads to a decrease in delamination, and therefore elimination of objectionable flowlines, or a diminution of objectionable flowlines in comparison to a similar composition prepared by throat feeding all the components.

EXAMPLE FOUR

Encapsulated aluminum flakes were prepared in beads comprising polystyrene cross-linked with divinylbenzene. The beads in each of these compositions contained about 3.9 wt. % aluminum flake on average, as measured by thermogravimetric analysis (TGA). Three different compositions were prepared comprising pigment beads and polystyrene matrix resin, the compositions respectively comprising 0.3 wt. % (7.6 wt. % bead), 0.7 wt. % (17.9 wt. % bead), and 1.2 wt. % (30.8 wt. % bead) of aluminum flake. A portion of the polystyrene matrix resin was in the form of powder. Individually, each of these compositions was added directly to a molding machine for preparing molded parts. The resulting molded parts made from these encapsulated beads did not show flowlines. For comparison, three similar compositions were prepared using unencapsulated aluminum flakes, and each of these compositions was then also added directly to a molding machine for preparing molded parts. The resulting molded parts made from compositions comprising these unencapsulated aluminum flakes showed visible flowlines.

EXAMPLE FIVE

Three different compositions of encapsulated aluminum flakes were prepared as beads comprising polystyrene (PS) cross-linked with divinylbenzene. These bead compositions were then extruded along with a polystyrene matrix resin, wherein at least a portion of the blend components were throat-fed, and at least a portion of the blend components were fed down-stream via a side feeder at barrel 5 of an 8-barrel extruder. Table 1 shows the blend compositions and processing conditions used in this example. For comparison, one similar composition (5-D) was prepared by throat-feeding all the blend components, and another similar composition (5-E) was prepared by down-stream feeding all the unencapsulated aluminum flakes in the composition. All components in this example are in wt. %, based on the weight of the entire composition. Parts molded from compositions 5-A, 5-B and 5-C all had significantly fewer flowlines visible than did parts molded from compositions 5-D and 5-E.

TABLE 1

| | Throat-fed Components | | Down-stream Fed Components | | |
| --- | --- | --- | --- | --- | --- |
| Composition | Polystyrene[a] (PS) | PS-encapsulated Al flakes | Free Al flakes[b] | PS-encapsulated Al flakes | PS |
| 5-A | 88.50 | — | — | 7.70 | 3.3 |
| 5-B | 81.55 | — | — | 17.95 | — |
| 5-C | 68.80 | — | — | 30.70 | — |
| 5-D | 79.55 | 19.95 | — | — | — |
| 5-E | 98.62 | — | 0.875 | — | — |

[a]Throat-fed PS contained 0.5 parts of organic lubricant.
[b]Unencapsulated Al flakes.

In order to enhance the design flexibility and improve the possibility of varying the refractive index of the encapsulation materials to match a broader range of matrix resins, it would be highly desirable to have a process that allows for the use of more than one monomer. Therefore, in some embodiments, the polymer beads comprise a combination of monomers, in variable ratios, with optional cross-linking. Any monomer that can be used in free radical suspension polymerization may be used here, such as, for example, styrene in combination with at least one of the following: acrylonitrile, methyl methacrylate (MMA), butadiene, or any other vinylic or olefinic monomer.

EXAMPLE SIX

In this embodiment, a higher solids content (i.e., higher monomers/water ratios), ranging from about 20-49 weight % gave a higher amount of beads per batch. The PVA concentration in water in this embodiment ranged from about 0.25 weight % to about 4 weight %. A different temperature profile during the initial stages of the suspension polymerization was also used here. Furthermore, it was found that by changing the way the monomer/flake mixture was added to the aqueous PVA solution, the final aluminum flake distribution in the beads could be influenced. In this embodiment, it was found that by adding the previously-sonicated monomer/flake mixture to a stirred aqueous PVA solution (as opposed to the non-turbulent, non-stirred aqueous PVA solution used in the previous examples), a much more uniform overall aluminum flake distribution in the beads was produced.

This embodiment was created using a 6 liter jacketed kettle reactor equipped with a six-blade Rushton stirrer. In this reactor, an aqueous solution of 59 grams of PVA (i.e., about 87-89% hydrolyzed, MW=124000-186000) and 2250 grams of deionized water was kept at 40° C., stirred at about 100 rpm, and purged with nitrogen for about 60 minutes. About 1128 grams of styrene, about 373 grams of acrylonitrile, about 23 grams of divinylbenzene and about 28 grams of aluminum flakes were combined in a volumetric flask, placed in an ultrasonic bath, and sonicated for about 10 minutes while shaking occasionally. After sonication, about 4.5 grams of benzoyl peroxide (the radical initiator) was added to the mix.

The monomer/flake/initiator mixture was then added to the aqueous PVA solution in one of two ways:
  (1) to the non-turbulent, non-stirred PVA solution in such a way that a two-phase system was obtained. After the addition of the monomer/flake/initiator mixture was complete, the stirring was switched on at about 250 rpm; or
  (2) to the stirred PVA solution while it was being stirred at about 250 rpm.

Either way, once the monomer/flake/initiator mixture was added, the system was allowed to equilibrate for about 15 minutes at about 40° C., then the temperature was raised to about 70° C. within about 30 minutes. After holding at about 70° C. for about 90 minutes, the temperature was raised to about 75° C., and held for about 120 minutes. Then the temperature was raised to about 80° C., and held for about 150 minutes while being stirred at about 300 rpm. Finally, the temperature was raised to about 85° C., and held for about 120 minutes while being stirred at about 350 rpm. Recovery, isolation and separation of the beads were accomplished in the same way as described in the previous examples.

If addition method (1) was used, typically approximately 700 grams of beads having a diameter smaller than about 300 µm were obtained per batch. This is approximately a 47% yield based on the monomers used. The average diameter of these beads was about 100±50 µm. The aluminum content of these beads ranged from about 15 to about 1 weight % as determined by thermogravimetric analysis (TGA).

If addition method (2) was used, typically approximately 900 grams of beads having a diameter smaller than about 300 µm were obtained per batch. This is approximately a 60% yield based on the monomers used. The average diameter of these beads was about 100±50 µm. The aluminum content of these beads ranged from about 8.5 to about 1.2 weight % as determined by TGA. The aluminum flake distributions that were obtained by the two methods of this example are shown in FIG. 6.

The beads produced by this method were compounded with clear ABS and molded into flowline-sensitive parts. The results obtained were favorable. The parts obtained did not exhibit any flowlines, even if high shear processing conditions (i.e., throat feeding all of the blend components) were used. This indicates that this process (EXAMPLE SIX) yields beads having few surface laminated flakes or free flakes. Furthermore, EXAMPLES FOUR, FIVE, and SIX demonstrate the importance of the relationship between bead morphology and the compounding/processing conditions that is necessary for achieving a final product having a flowline-free appearance.

EXAMPLE SEVEN

Figure 7:
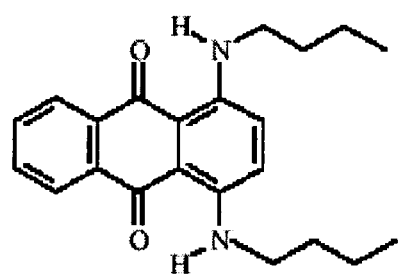
FIG. 7 shows the chemical structures of various additives that may be added to embodiments of this invention.
Figure 7:
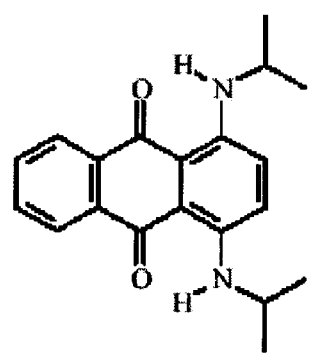
Figure 7:
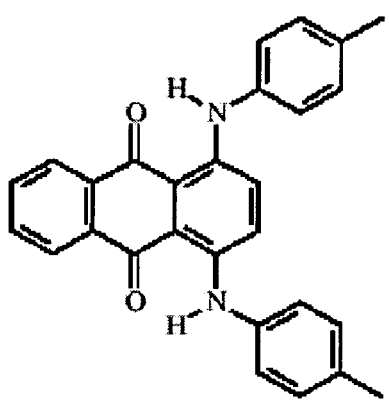
Figure 7:
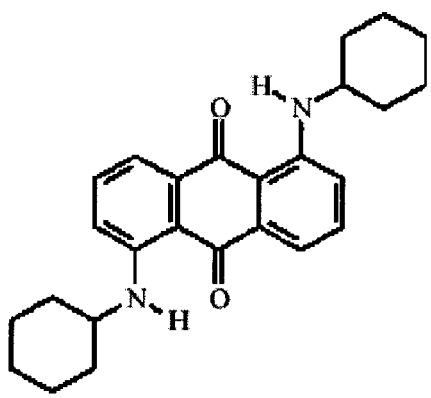
Figure 7:
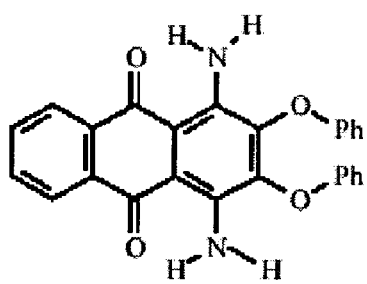
Figure 7:
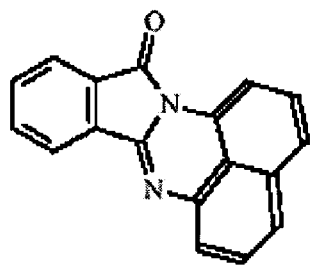
Figure 7:
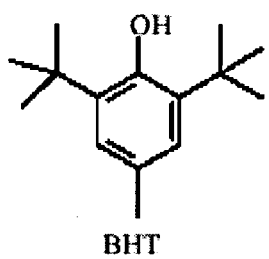

In this embodiment, various dyes, together with aluminum flakes, were incorporated into cross-linked polymeric beads to create a colored visual effect in a matrix resin. Some of the dyes used in this embodiment are shown in FIG. 7. This embodiment yielded flakes that were encapsulated within small, colored beads. This example disregarded the effect of the molecular structure of the dye on the reaction yield.

In this embodiment, dye was added to the mixture of aluminum flakes and monomer of EXAMPLE SIX prior to sonication. Ideally, the dye should be soluble in the monomer solution, and preferably, the dye should be significantly more soluble in the organic/monomer phase than in the aqueous phase used in the suspension polymerization reaction. Upon dissolution of the dye, and subsequent sonication, the mixture was then added to the aqueous phase in the normal manner, and the appropriate stirring and temperature profiles for the monomer were used (i.e., the profiles that were described above in EXAMPLE SIX). Isolation of the final beads was then carried out using the standard gravity sedimentation technique previously discussed above.

By varying the loading of the dye, the color and strength of the end effect was varied. More loading of the dye produced beads having a more vibrant color, while less loading of the dye produced beads having less color. Additionally, high loading of the colored beads in a matrix resin resulted in a colored, sparkling matrix that was not significantly different in sparkling appearance from a resin containing colorless beads. However, at low loading of the beads, the colored beads remained resolved (i.e., optically separated) from the color of the surrounding resin matrix, giving a flowline-free sparkling effect where the aluminum flakes appeared to be colored.

Once these beads were created, 40 grams of these colored beads were compounded and injection molded in 500 grams of clear acrylonitrile butadiene styrene plastic (ABS). These beads yielded a colored sparkling product that was substantially free of visible flowlines.

EXAMPLE EIGHT

In this embodiment, specific dyes, together with aluminum flakes, were incorporated into the cross-linked polymeric beads. These specific dyes provided better bead yields than embodiments produced without any dye. Typical bead yields when co-polymerizing styrene and acrylonitrile without any dye are in the 50-60% range. Such a yield is below the typical acceptable yield for large-scale industrial processes for reasons such as raw material costs, separation of product from impurities, and cost of by-product disposal. It has been found that, in the presence of certain anthraquinone-derived dyes, styrene acrylonitrile (SAN) bead yields of greater than about 90% are obtainable. In addition to the dramatically increased yield of the suspension polymerization, this method also decreased the amount of microemulsion, an unwanted side-product.

In this embodiment, Solvent Blue 35, or more preferably Solvent Blue 36, was added to the mixture of aluminum flakes and monomer prior to sonication. The chemical structures of Solvent Blue 35 and Solvent Blue 36 are shown in FIG. 7. Upon dissolution of the dye, and subsequent sonication, the mixture was then added to the aqueous phase in the normal manner, and the appropriate stirring and temperature profiles for the monomer were used.

For example, a mixture of about 1125 grams of styrene, about 375 grams of acrylonitrile, about 22.5 grams of divinylbenzene, about 28.5 grams of aluminum flakes, and about 900 mg of Solvent Blue 36 was prepared and sonicated for about 15 minutes. About 4.5 grams of benzoyl peroxide was then added to this mixture, and the resulting mixture was then added to a nitrogen-purged solution of about 59 grams of polyvinyl alcohol in about 2250 ml of water. Standard stirring (at about 250-280 rpm) and temperature profiles, as detailed in EXAMPLE SIX, were then followed. Recovery, isolation and separation of the beads were accomplished in the same way as described in the previous examples.

The color of the mixture began changing a few minutes after the monomer solution was added to PVA/water solution. After about 3 hours, the reaction was sufficiently thick that about 200 ml of water was added, and stirring was then increased to about 350 rpm. The reaction was stopped and the product isolated in the same manner as outlined above in the previous examples. The final beads in this example were noticeably violet in color, and about a 90% yield (based on the monomers) was obtained.

Alternatively, a smaller amount of dye was used (about 238 mg of Solvent Blue 36). This provided about a 78% yield, and the beads had only a slightly violet tint.

Using about 238-900 mg of Solvent Blue 36 provided a yield of about 78-90%. Subsequent acetone washing/slurrying yielded beads having little or no violet coloration.

Beads with different amounts of incorporated dye were compounded with ABS, or ABS comprising methyl methacrylate as the co-monomer, and molded into flowline sensitive parts. Visible flowlines were eliminated. Increasing the amount of the active dye induced an increasingly positive effect on yield, and resulted in beads having more color. A loading of dye sufficiently low to result in insignificant discoloration of the SAN beads (for example, about 240 mg) resulted in yields around 80%. Upon bead isolation, washing with a solvent that causes a certain swelling of the beads (i.e., acetone) removed a significant amount of the dye from the bead matrix. This provided a way to produce essentially colorless beads at a much higher yield than previously possible. It was also observed that when these beads were received from the polymerization process, they contained tiny bubbles, but after they were acetone-washed, the beads were free of bubbles. Such bubbles were not observed in beads produced in any of the preceding examples.

By varying the loading of the dye, and by varying the amount of washing done to the beads, the color and strength of the end effect could be varied. More loading of the dye and less washing of the beads produced beads having a more vibrant color, while less loading of the dye and more washing of the beads produced beads having less color.

As described above, the systems and methods of the present invention allow a user to encapsulate high aspect ratio materials within a polymer to form substantially spherical beads. These beads may then be used to create plastic products having a sparkling and/or metallescent appearance.

Figure 8:
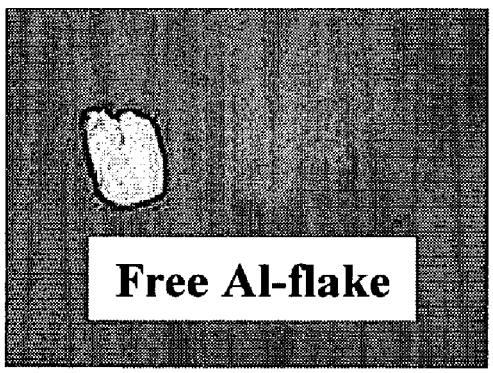
FIG. 8 is two photographs showing two molded parts, wherein one part is prepared using free metallic flakes and the other part is prepared using encapsulated metallic flakes.
Figure 8:
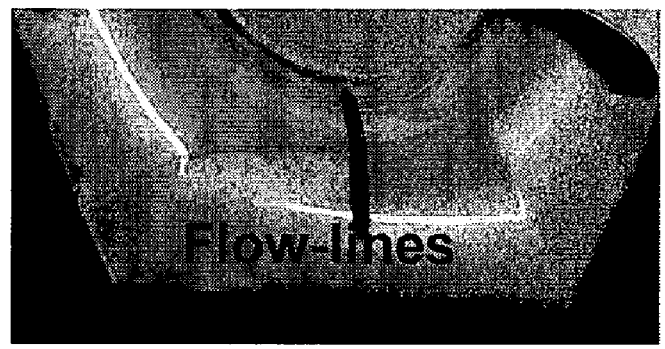
Figure 8:
Figure 8:
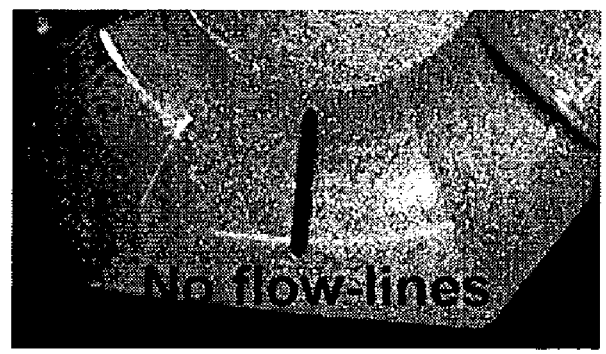

FIG. 8 shows a comparison of two molded parts, each comprising a polystyrene matrix, wherein one part was prepared using free metallic flakes and the other part was prepared using aluminum flakes encapsulated in polystyrene cross-linked with divinylbenzene. Each composition was prepared by mixing the blend components in a molding machine. Advantageously, these systems and methods created plastic products that were visually flowline free, something that was not easily or economically obtained before this invention.

Various embodiments of the invention have been described in fulfillment of the various needs that the invention meets. It should be recognized that these embodiments are merely illustrative of the principles of various embodiments of the present invention. Reaction conditions may vary from equipment to equipment, and therefore adjustments to these above-described processes may be necessary to produce good beads. Numerous other modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A pigment comprising:
   a substantially spherical-shaped bead comprising a high aspect ratio particle encapsulated within an encapsulating material,
   wherein the substantially spherical-shaped bead has an average diameter of about 10 µm to about 300 µm, and an amount of the high aspect ratio particle encapsulated within the encapsulating material is about 0.1 to about 25 weight percent, based on the weight of the substantially spherical-shaped bead.

2. The pigment of claim 1, wherein the high aspect ratio particle comprises at least one member selected from the group consisting of: aluminum, gold, silver, copper, nickel, titanium, stainless steel, nickel sulfide, cobalt sulfide, manganese sulfide, metal oxides, white mica, black mica, synthetic mica, mica coated with titanium dioxide, metal-coated glass flakes, and colorants.

3. The pigment of claim 1, wherein the encapsulating material comprises a polymer with structural units derived from at least one monomer selected from the group consisting of styrene, alpha-methyl styrene, para-methyl styrene, acrylonitrile, alkyl acrylate, alkyl methacrylate, methyl methacrylate, divinyl benzene, and mixtures thereof.

4. The pigment of claim 1, wherein the encapsulating material comprises at least one member selected from the group consisting of: polystyrene, polymethyl methacrylate, styrene acrylonitrile copolymer, methyl methacrylate styrene acrylonitrile copolymer, and an acrylonitrile-styrene-acrylate resin.

5. The pigment of claim 1, wherein the pigment further comprises an additive.

6. The pigment of claim 5, wherein the additive comprises at least one member selected from the group consisting of: a colorant, a thermal stabilizer, an oxidation inhibitor, butylated hydroxytoluene, a radical scavenger, a vinyl-based monomer, a filler, an impact modifier, a UV absorber, and a fire retardant.

7. The pigment of claim 6, wherein the colorant comprises at least one member selected from the group consisting of: Solvent Blue 35, Solvent Blue 36, Disperse Violet 26, Solvent Green 3, Anaplast Orange LFP, Morplas Red 36, and Perylene Red.

8. The pigment of claim 1, wherein the encapsulating material is transparent.

9. The pigment of claim 1, wherein the encapsulating material is translucent.

10. The pigment of claim 1, wherein the substantially spherical-shaped bead has an average aspect ratio of about 1:1 to about 2:1.

11. The pigment of claim 1, wherein the high aspect ratio particle has an average aspect ratio of greater than about 4:1.

12. The pigment of claim 11, wherein the average aspect ratio is greater than about 8:1.

13. The pigment of claim 1, wherein the high aspect ratio particles comprise about 2 to about 100 facets.

14. The pigment of claim 1, wherein the high aspect ratio particle comprises at least one member selected from the group consisting of: gold, silver, copper, titanium, stainless steel, nickel sulfide, cobalt sulfide, manganese sulfide, metal oxides, mica coated with titanium dioxide, metal-coated glass flakes, and colorants.

15. The pigment of claim 1, wherein the amount is about 2 to about 15 weight percent.

16. The pigment of claim 1, wherein the average diameter is about 40 μm to about 250 μm.

17. The pigment of claim 16, wherein the average diameter is about 80 μm to about 200 μm.

18. The pigment of claim 1, wherein the average diameter is about 50 μm to about 150 μm.

19. A pigment comprising:
a substantially spherical-shaped bead comprising a high aspect ratio aluminum flake encapsulated within an encapsulating material comprising a polymer with structural units derived from styrene, wherein the substantially spherical-shaped bead has an average diameter of about 40 μto about 250 μm,
wherein the flake has an average aspect ratio of greater than about 4:1, and
wherein an amount of the flake encapsulated in the encapsulating material is about 0.1 to about 25 weight percent, based on the weight of the substantially spherical-shaped bead.

20. A resinous composition comprising a plastic matrix material and a pigment, the pigment comprising a substantially spherical-shaped bead comprising a high aspect ratio particle encapsulated within an encapsulating material,
wherein the substantially spherical-shaped bead has an average diameter of about 10 μm to about 300 μm, and
an amount of the high aspect ratio particle encapsulated within the encapsulating material is about 0.1 to about 25 weight percent, based on the weight of the substantially spherical-shaped bead.

21. The resinous composition of claim 20, wherein the plastic matrix material comprises at least one member selected from the group consisting of thermoplastics, polyesters, polyolefins, polyethylene, polypropylene, polybutylene, polymethylpentene; resins comprising structural units derived from styrene monomer, polystyrene, styrene-acrylonitrile copolymer, acrylonitrile-styrene-butadiene, acrylonitrile-styrene-acrylate; polyamide; polycarbonate; bisphenol A polycarbonate; polyphenylene ether; polyimide; polyamide imide; polyetherimide; polysulfone; polyether sulfone; polyketone; polyether ketone; polyether ether ketone; polyarylate; phenoxy resins; fluorocarbon resins; thermoplastic elastomers; thermoplastic elastomers derived from polystyrene, from polyolefin, from polyurethane, from polyester, from polyamide, from polybutadiene, from polyisoprene, from fluorine-containing monomer; a natural rubber, a synthetic rubber, copolymers or modifications of any of the these substances, and combinations of two or more of these substances.

22. The resinous composition of claim 20, wherein the high aspect ratio particles comprise at least one member selected from the group consisting of: aluminum, gold, silver, copper, nickel, titanium, stainless steel, nickel sulfide, cobalt sulfide, manganese sulfide, metal oxides, white mica, black mica, synthetic mica, mica coated with titanium dioxide, metal-coated glass flakes, and colorants.

23. The resinous composition of claim 20, wherein the encapsulating material comprises a polymer with structural units derived from at least one monomer selected from the group consisting of styrene, alpha-methyl styrene, para-methyl styrene, acrylonitrile, alkyl acrylate, alkyl methacrylate, methyl methacrylate, divinyl benzene, and mixtures thereof.

24. The resinous composition of claim 20, wherein the encapsulating material comprises at least one member selected from the group consisting of: polystyrene, polymethyl methacrylate, styrene acrylonitrile copolymer, methyl methacrylate styrene acrylonitrile copolymer, and an acrylonitrile-styrene-acrylate resin.

25. The resinous composition of claim 20, wherein the encapsulating material is transparent.

26. The resinous composition of claim 20, wherein the encapsulating material is translucent.

27. The resinous composition of claim 20, wherein a refractive index difference between the plastic matrix and the encapsulating material of the pigment is less than about 0.01.

28. The resinous composition of claim 20, wherein a refractive index difference between the plastic matrix and the encapsulating material of the pigment is in the range of between about 0.01 and about 0.05.

29. The resinous composition of claim 20, wherein the substantially spherical-shaped bead has an average aspect ratio of about 1:1 to about 2:1.

30. The resinous composition of claim 20, wherein the high aspect ratio particle has an average aspect ratio of greater than about 4:1.

31. The resinous composition of claim 30, wherein the average aspect ratio is greater about 8:1.

32. The resinous composition of claim 20, wherein the high aspect ratio particle comprises about 2 to about 100 facets.

33. The resinous composition of claim 20, wherein unencapsulated high aspect ratio particles comprise no more than 1 weight percent of the composition.

34. The resinous composition of claim 20, wherein the substantially spherical-shaped bead is colored.

35. The resinous composition of claim 20, formed by a process which comprises an extrusion compounding step in an extruder.

36. The resinous composition of claim 35, wherein at least a portion of pigment is fed to the extruder at a down-stream feed inlet.

37. A molded article made from the composition of claim 20.

38. The molded article of claim 37 formed by a process which comprises compounding the composition during molding.

39. The resinous composition of claim 20, wherein the amount is about 2 to about 15 weight percent.

40. The resinous composition of claim 20, wherein the average diameter is about 40 μm to about 250 μm.

41. The resinous composition of claim 40, wherein the average diameter is about 80 μm to about 200 μm.

42. A resinous composition, comprising:
a plastic matrix material and a pigment, wherein the pigment comprises an additive and a substantially spherical-shaped bead comprising a high aspect ratio particle encapsulated within an encapsulating material wherein the substantially spherical-shaped bead has an average diameter of about 40 μm to about 250 μm.

43. The resinous composition of claim 42, wherein the additive comprises at least one additive member selected from the group consisting of: a colorant, a thermal stabilizer, an oxidation inhibitor, butylated hydroxytoluene, a radical scavenger, a vinyl-based monomer, a filler, an impact modifier, a UV absorber, and a fire retardant.

44. The resinous composition of claim 43, wherein the colorant comprises at least one colorant member selected from the group consisting of: Solvent Blue 35, Solvent Blue 36, Disperse Violet 26, Solvent Green 3, Anaplast Orange LFP, Morplas Red 36, and Perylene Red.

45. A resinous composition comprising an acrylonitrile-styrene-butadiene matrix material and a pigment comprising a substantially spherical-shaped bead comprising a high aspect ratio aluminum flake encapsulated within an encapsulating material comprising a polymer with structural units derived from styrene, wherein the flake has an average aspect ratio of greater than about 4:1, and wherein an amount of the flake encapsulated in the encapsulating material is about 0.1 to about 25 weight percent, based on the weight of the substantially spherical-shaped bead.

46. The resinous composition of claim 45, wherein the matrix material further comprises polycarbonate.

47. A molded article made from the composition of claim 45.

48. A molded article made from the composition of claim 46.

49. A pigment, comprising:
a substantially spherical-shaped bead comprising a high aspect ratio particle encapsulated within a cross-linked encapsulating material wherein the substantially spherical-shaped bead has an average diameter of about 40 μm to about 250 μm.

50. The pigment of claim 49, wherein the substantially spherical-shaped bead has an average diameter of about 50 μm to about 150 μm.

51. The pigment of claim 49, wherein the average diameter is about 80 μm to about 200 μm.

52. The pigment of claim 49, wherein an amount of the high aspect ratio particle encapsulated in the encapsulating material is about 0.1 to about 25 weight percent, based on the weight of the substantially spherical-shaped bead.

53. The pigment of claim 49, wherein the substantially spherical-shaped bead is a sphere.

* * * * *